(12) United States Patent
Oh

(10) Patent No.: US 7,610,455 B2
(45) Date of Patent: Oct. 27, 2009

(54) TECHNIQUE TO READ SPECIAL MODE REGISTER

(75) Inventor: Jong-Hoon Oh, Chapel Hill, NC (US)

(73) Assignee: Infineon Technologies AG, Munich (DE)

( * ) Notice: Subject to any disclaimer, the term of this patent is extended or adjusted under 35 U.S.C. 154(b) by 179 days.

(21) Appl. No.: 11/126,684

(22) Filed: May 11, 2005

(65) Prior Publication Data

US 2006/0259711 A1    Nov. 16, 2006

(51) Int. Cl.
*G06F 9/26* (2006.01)
*G06F 9/34* (2006.01)
*G06F 12/00* (2006.01)
*G06F 13/00* (2006.01)
*G06F 13/28* (2006.01)

(52) U.S. Cl. ................... 711/156; 711/220
(58) Field of Classification Search .......... 711/154, 711/156
See application file for complete search history.

(56) References Cited

U.S. PATENT DOCUMENTS

2004/0196725 A1   10/2004  Kang
2006/0044909 A1*  3/2006   Kinsley et al. .......... 365/222
2006/0181957 A1*  8/2006   Walker ................ 365/233

OTHER PUBLICATIONS

Samsung GDDR2 SDRAM Part No. K4N26323AE-GC Data Sheet.*
Samsung GDDR2 SDRAM Part No. K4N26323AE-GC Data Sheet, pp. 8-12.*
U.S. Appl. No. 60/653,020, Status Register for Non-Volatile Memories, Feb. 14, 2005.*
Jeff Janzen, DDR2 Offers New Features and Functionality, Micron Designline, vol. 12, Issue 2, 3Q03, Jul. 31, 2003, pp. 1-16, Micron Technology, Inc., Boise, Idaho.
Elpida Memory Inc., 512MB Registered DDR2 SDRAM DIMM, EBE51RD8ABFA, ELPIDA Data Sheet E0402E40 (Ver. 4.0), Jul. 2004, Japan.
Samsung Electronics Data Sheet No. K4N26323AE-GC, "128Mbit GDDR2 SDRAM: 1M x 32Bit x 4 Banks GDDR2 SDRAM with Differential Data Strobe and DLL", Revision 1.7, Jan. 2003, available at www.datasheetcatalog.org/datasheets2/84/846627_1.pdf.

* cited by examiner

*Primary Examiner*—Christian P Chance
*Assistant Examiner*—Chad L Davidson
(74) *Attorney, Agent, or Firm*—Patterson & Sheridan, L.L.P.

(57) ABSTRACT

Embodiments are provided in which a method and apparatus for accessing a special mode register of a memory device are described. A command to access the special mode register is detected. The command is executed by driving data from the special mode register onto a data bus. The command self-terminates by placing the data bus in a high impedance state. One or more unused address bits may specify one of a plurality of special mode registers to be accessed by the command. The command to access the special mode register may be incapable of changing one or more bits in a mode register.

19 Claims, 7 Drawing Sheets

TECHNIQUE TO READ SPECIAL MODE REGISTER

BACKGROUND OF THE INVENTION

1. Field of the Invention

The invention generally relates to memory devices and, more particularly, to reading a special mode register of a memory device.

2. Description of the Related Art

In addition to storing and retrieving data, modern memory devices typically provide information and controls which may be used to access information about the memory device and to adjust the operational characteristics of the memory device. The information and controls are usually accessible through registers in the memory device known as mode registers. Because the memory device may contain more information and controls than are accessible by a single mode register (MR), the memory device may contain another mode register, known as the extended mode register (EMR), to access the remaining information and controls.

Each mode register is typically accessed using what is commonly referred to as a mode register set command (MRS command). The MRS command may be used to change control bits in the accessed mode register, which may change how the device operates. The control bits may also be used to access information about the device. The information about the device, such as a vendor ID (information identifying a manufacturer of the device) or operational characteristics of the device (such as temperature), may be stored in other registers known as special mode registers (SMR). Use of the control bits of an EMR to control the device and to access the special mode registers is described below with respect to FIGS. 1A-B.

The control bits 100 of EMR are depicted in FIG. 1A. Bank address bits (BA[1:0]) 102 provided with the MRS command are used to choose between MR (where BA[1:0]='00') and EMR (where BA[1:0]='01'). Other bank address combinations in the prior art (BA[1:0]='10' and BA[1:0]='11') may be reserved for future use (RFU). In the case depicted in FIG. 1, EMR (BA[1:0]='01') is being accessed by the MRS command.

The address bits (A[11:0]) 110 are used to set the control bits in EMR as follows. Bits A[1:0] may set an output drive impedance (Data Z) for the device, bits A[3:2] may set an on-die termination resistance (Rt), bits A[5:4] may set a number of write recovery cycles (WR), bit A6 may control a delay-locked loop (DLL), and bit A11 may be used to place the device in a low power mode (LP). Other bits, A[9:7], may be reserved for future use (RFU). Bit A10 may be used to access a special mode register containing vendor ID information (V), FIG. 1B is a timing diagram which depicts the prior art method for reading the vendor ID. In order to read a vendor ID of the prior art the special mode register for the vendor ID is first placed in a read mode by setting bit A10 in the EMR using the MRS command. Thus, at time T1, the MRS command is issued, EMR is selected by setting BA[1:0]='01', and bit A10 is asserted to indicate that the vendor ID information is to be read. The command may also set other bits in EMR using the remaining address bits A[9:0] and A11. Thus, each time the vendor ID is read, other control bits are set at the same time. At some time later, after the vendor ID is placed in read mode, the vendor ID information 120 (containing a vendor code and revision ID) is output on a data bus (such as a 16 bit data bus, DQ[15:0]).

While the vendor ID is in read mode, the vendor ID information 120 continues to be output on the data bus. In order take the vendor ID out of read mode (and to stop driving the vendor ID information 120 onto the data bus), another MRS command must be issued with A10 at a low logic level, thus clearing the vendor ID bit in EMR. Accordingly, at T2, another MRS command may be issued with BA[1:0]='01', thus selecting EMR as the destination register, and bit A10 driven to a low logic level, thus clearing the vendor ID bit in EMR. At some time T3 after the vendor ID bit in EMR is cleared, the device will stop driving the vendor ID information onto the data bus, and the data bus may subsequently be used to read other data or to input data into the memory device.

Such a method of reading a special mode register in a memory device has several drawbacks. First, in order to read the special mode register, two commands are required, one to place the special mode register in read mode and another to take the special mode register out of read mode. Each of these commands takes a number of clock cycles to execute. Also, if the user of the device inadvertently places the special mode register into read mode by issuing an MRS command for EMR with A10='1', or if the user intentionally places the special mode register in read mode but neglects to later take the special mode register out of read mode, the special mode register data will continue to be driven onto the data bus. If the user later tries to write to the memory device and drives data onto the bus while the special mode register information is being driven onto the bus, the data bus is placed in contention.

Accordingly, what is needed is an improved method for reading a special mode register.

SUMMARY OF THE INVENTION

Embodiments of the present invention provide methods, integrated circuits, and memory devices for accessing a special mode register of a memory device.

One embodiment of the present invention provides a method, integrated circuit, and memory device for accessing a special mode register of a memory device. The method includes detecting a command to access the special mode register, executing the command by driving data from the special mode register onto a data bus, and self-terminating the command by automatically placing the data bus in a high impedance state some time after driving the data. The integrated circuit and memory device each include at least one special mode register, a command decoder, and access circuitry configured to perform the described method.

Another embodiment of the invention provides a method for accessing a special mode register of a memory device. The method includes detecting a command to access one of a plurality of special mode registers, selecting one of the special mode registers based on an address presented in conjunction with the command, driving data from the selected special mode register onto a data bus, and self-terminating the command by automatically placing the data bus in a high impedance state.

Yet another embodiment of the invention provides an integrated circuit including two or more special mode registers, a command decoder, and access circuitry. The access circuitry is configured to receive one or more signals from the command decoder indicating receipt of a command to access a specified special mode register of the two or more special mode registers, and, in response, drive data from the specified special mode register onto a data bus, and self-terminate the command by automatically placing the data bus in a high impedance state. The selected special mode register is specified by an address presented in conjunction with the command.

In another embodiment of the invention, a memory device is provided. The memory device includes at least one special mode register, a mode register, an extended mode register, a command decoder, and access circuitry. The access circuitry is configured to receive one or more signals from the command decoder indicating receipt of a command to access the special mode register and, in response, drive data from the special mode register onto a data bus, and self-terminate the command by automatically placing the data bus in a high impedance state. The command comprises two or more bank address bits, wherein a first combination of bank address bits specifies the command to drive the data from the special mode register onto the data bus, wherein a second combination of bank address bits specifies a command to set one or more bits in the mode register, and wherein a third combination of bank address bits specifies a command to set one or more bits in the extended mode register.

Yet another embodiment of the invention provides a memory device. The memory device includes means for storing information about the memory device, means for decoding commands received by the memory device, and means for accessing the means for storing. The means for accessing is configured to receive one or more signals from the means for decoding indicating receipt of a command to access means for storing and, in response, drive data from the means for storing onto a data bus, and self-terminate the command by automatically placing the data bus in a high impedance state.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments are provided in which a method and apparatus for accessing a special mode register of a memory device are described. A command to access the special mode register is detected. The command is executed by driving data from the special mode register onto a data bus. The command self-terminates by automatically placing the data bus in a high impedance state some known number of cycles later without requiring a second command.

Because the command self-terminates, only one command may be needed to access the special mode register. Thus, fewer clock cycles will be required with the single command than reading the special mode register with multiple commands. Further, because the command self-terminates by placing the data bus in a high impedance state, the user does not need to remember to terminate the command and later attempts to write data to the data bus will not place the bus in contention. For some embodiments of the invention, the command to access the special mode register may be made incapable of changing one or more bits in a mode register. Accordingly, the user may not need to worry about making unwanted changes in operation of the memory device.

While embodiments of the invention are described with respect to reading the special mode register of a memory device, other embodiments are contemplated in which other registers of other devices are read. For instance, an ordinary register may be read, and the device may include a central processing unit (CPU), graphical processing unit (GPU), or any other type of integrated circuit containing registers. Furthermore, the memory device may be a synchronous dynamic random access memory (SDRAM), double data rate SDRAM (DDR SDRAM), low-power SDRAM, low-power DDR SDRAM, or any other type of memory known to those skilled in the art. Also, the names given to any input signals, output signals, registers, register bits, or other combination of bits such as address bits, bank address bits, mode register, extended mode register, special mode register, vendor ID bit, DQS, DQ, MR, MRS, SMR, EMRS, etc. are used to illustrate embodiments and are not meant to be limiting.

An Exemplary Memory Device

Figure 2:
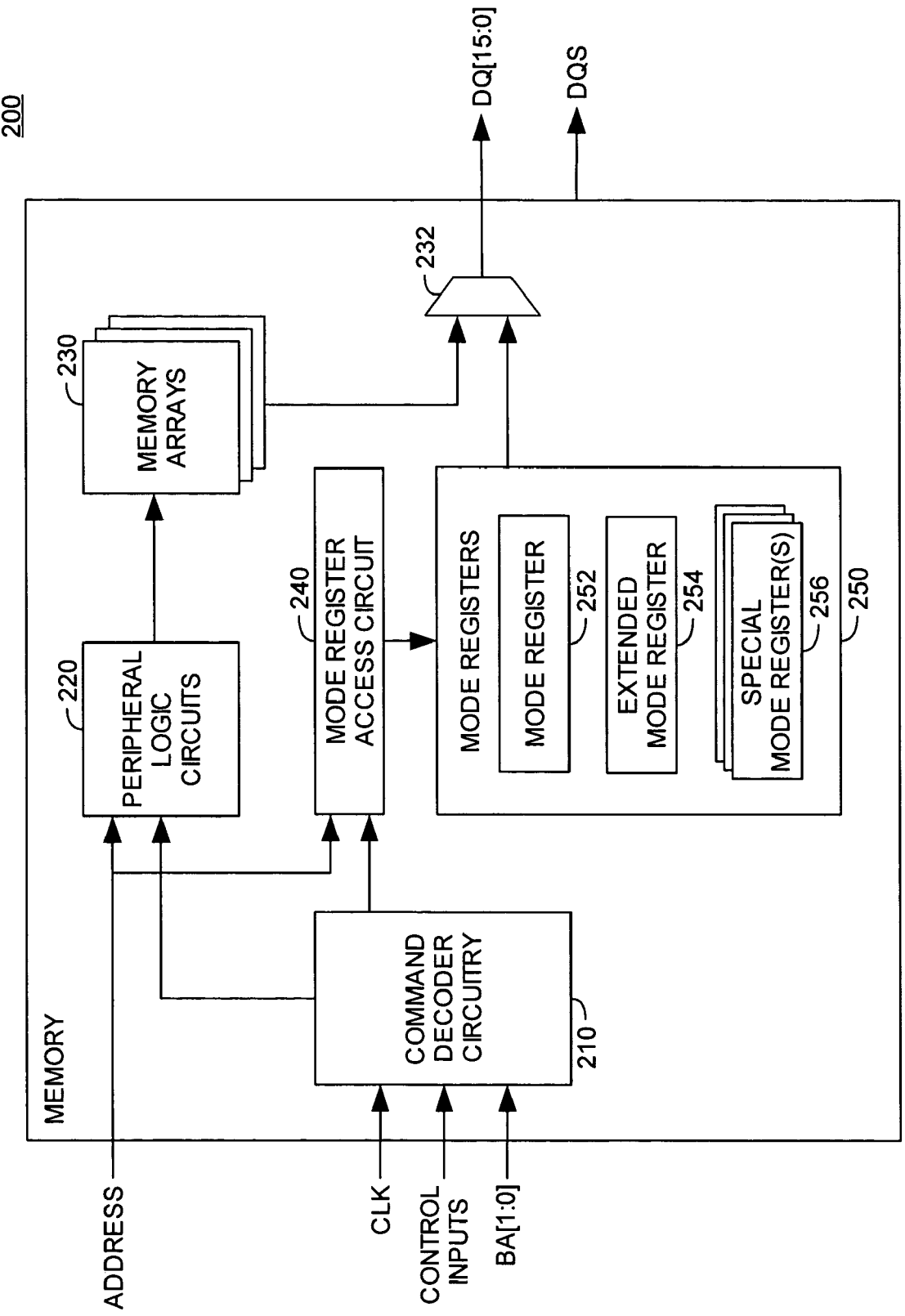
FIG. 2 is a block diagram depicting a memory device containing special mode registers according to one embodiment of the invention.

FIG. 2 is a block diagram depicting a memory device 200 containing special mode registers (SMRs) 256 according to one embodiment of the invention. The memory device 200 may accept several input signals including but not limited to a clock signal (CLK), control input bits, address bits, and bank address bits(BA[1:0]). The input signals are routed inside the memory device 200 to command decoder circuitry 210, peripheral logic circuits 220, and a mode register access circuit. The command decoder circuitry 210 may use CLK, the control input bits, and BA[1:0] to decode incoming commands and issue control signals to other parts of the memory device 200 such as the peripheral logic circuits 220 and the mode register access circuit 240. The peripheral logic circuits 220 may use the control signals from the command decoder circuitry 210 as well as the address bits to read from and write to memory arrays (or banks) 230 within the memory device, depending on the command being received by the memory device 200.

Similarly, the mode register access circuitry 240 may use control signals from the command decoder circuitry 210 as well as the address bits to read from and write to the mode registers 250. The mode registers 250 may include a mode register (MR) 252, an extended mode register (EMR) 254, and one or more SMRs 256. A multiplexer 232 may be used to output either data from the memory arrays 230 or data from the mode registers 250 to a data bus (DQ[15:0]) depending on the command being issued to the memory device 200. A data strobe signal (DQS) may also be used to alert any other device reading data from the memory device 200 that the data on the data bus DQ[15:0] is valid data.

As described above, the mode registers 250 may be used to control special features of the memory device 200 and to access special information about the memory device 200. MR 252 may be used to control and access a first portion of the device capabilities, and because the device may have a large number of capabilities, EMR 254 may be used to control and access extended device capabilities. The one or more SMRs 256 may also be used to access and control information about the device, such as vendor ID information or operational characteristics of the device. For instance, the temperature of the device may be provided, either directly as a digital value in a special mode register indicating the temperature or indirectly by reading out the refresh rate or the clock rate of the memory device 200 from a special mode register.

Reading A Special Mode Register

Embodiments of the present invention provide a method and apparatus for accessing an SMR 256 of the memory device 200 using a special variation of a mode register set command (referred to as an MRS read command, or MRS-R command). Previously, the bank address combinations of BA[1:0]='10' and BA[1:0]='11' were reserved for future use, and because both reserved combinations have BA[1]='1', any use of BA[1]='1' resulted in an illegal operation. However, according to one embodiment of the invention, one of the unused bank address combinations (e.g., BA[1:0]='11') may be used with the MRS-R command to perform a read of SMR 256.

Figure 3:
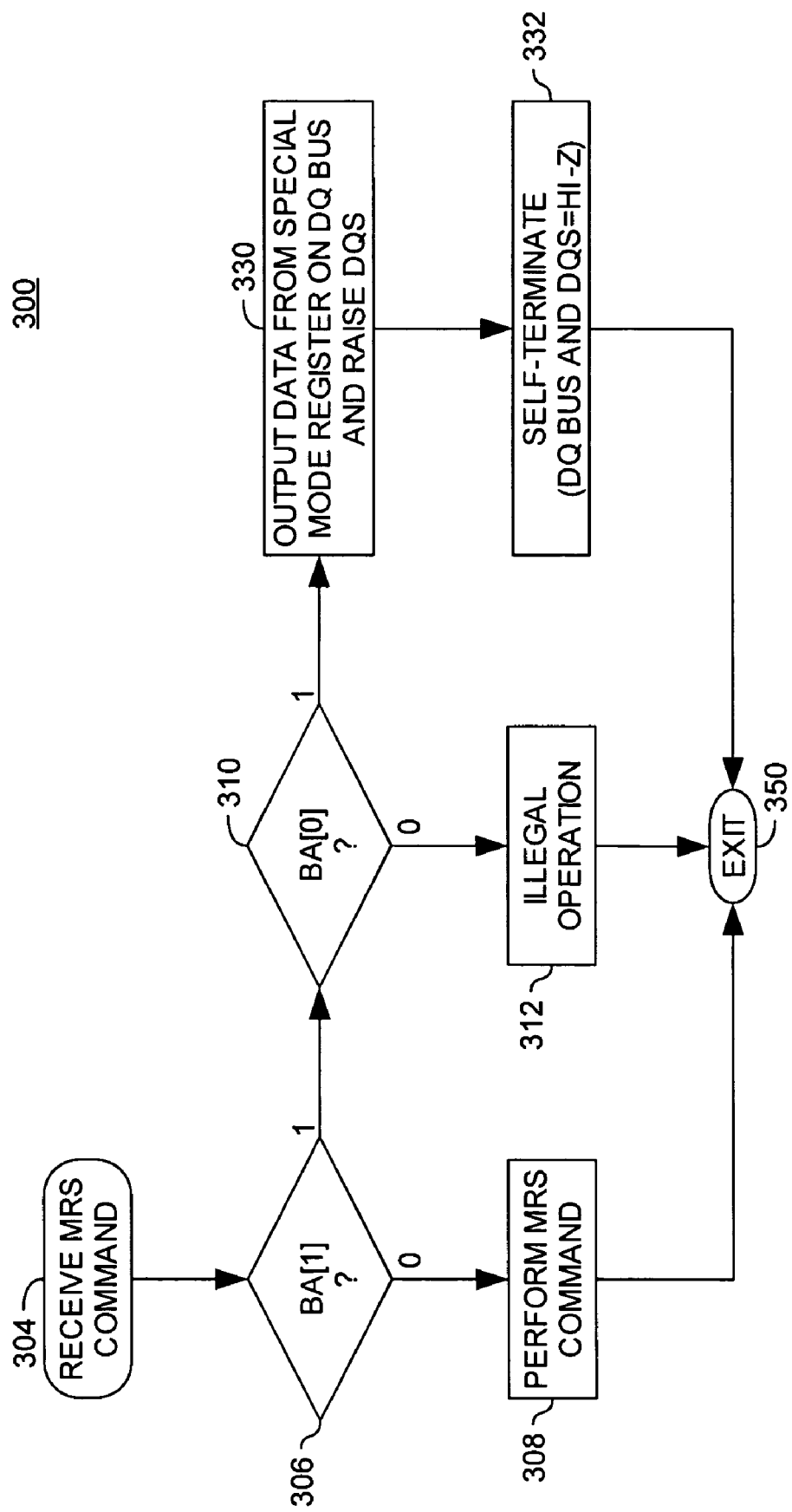
FIG. 3 is a flow chart depicting a process for reading a special mode register according to one embodiment of the invention.

FIG. 3 is a flow chart depicting a process 300 for reading a single SMR 256 using the MRS-R command according to one embodiment of the invention. The process may begin at step 304 where an MRS command is received. The process may then continue to step 306 where bank address bit 1 (BA[1]) is examined.

As described above, the bank address bits BA[1:0] are typically used with the MRS command to specify which mode register the MRS command should writing to. When MRS is issued with BA[1:0]='00', MR is written to by MRS and when MRS is issued with BA[1:0]='01', EMR is written to by MRS (also referred to as an extended mode register set (EMRS)).

Accordingly, at step 306, BA[1] is examined. If BA[1] is '0', a conventional MRS or EMRS command is performed at step 308 and the process 300 terminates at step 350. If, however, BA[1] is one, the process 300 may continue to step 310 where BA[0] is examined. Because the bank address combination of BA[1:0]='10' may still be reserved for future use, if BA[0] is determined to be '0' at step 310, the reserved bank address combination may cause an illegal operation to be performed at step 312 and the process 300 may terminate at step 350.

If, however, BA[0] is determined to be '1' at step 310 (i.e., BA[1:0]='11'), the MRS-R command may be issued to read SMR 256. Thus, the process 300 may output data from SMR 256 at step 330 and optionally raise DQS to signal that valid data is being output on the data bus DQ[15:0].

After SMR 256 is output, the MRS-R command may then self-terminate at step 332 by placing the data bus DQ[15:0] and DQS in a high impedance (Hi-Z) state. When the signal lines for DQ[15:0] and DQS are placed in a high impedance state, other devices connected to those lines may safely drive data onto the data bus without placing the data bus in contention (e.g., by having both devices try to drive data onto the same data bus lines). After the MRS-R command self-terminates at step 332, the process 300 may terminate at step 350.

Figure 4:
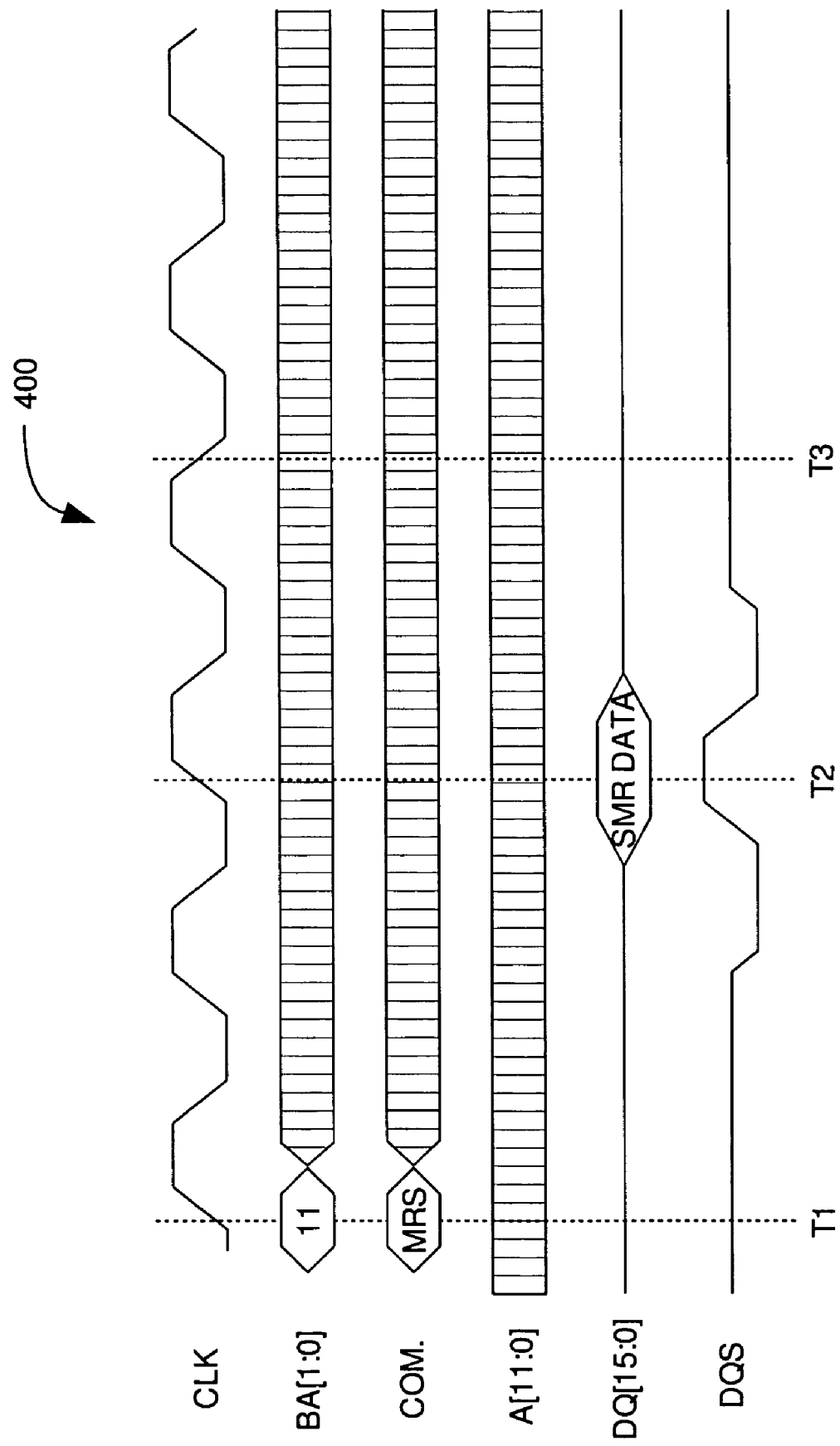
FIG. 4 is a timing diagram depicting a timing sequence for accessing a special mode register according to one embodiment of the invention.

FIG. 4 is a timing diagram depicting a timing sequence 400 for accessing SMR 256 using the MRS-R command according to one embodiment of the invention. At time T1, the MRS-R command may be initiated, as illustrated, by placing the MRS command on the command inputs and by placing BA[1:0]='11' on the bank address inputs.

In one embodiment of the invention, the MRS-R command may not write to MR or EMR or otherwise use the address inputs A[11:0], and accordingly the address inputs A[11:0] may be placed in a high impedance state. This may help prevent the user of the memory device 200 from accidentally changing the control bits in MR and EMR, and also prevent the user from placing the mode registers 250 in a read-out mode which the user may later forget to change (possibly causing contention on the bus as described above).

Figure 1:
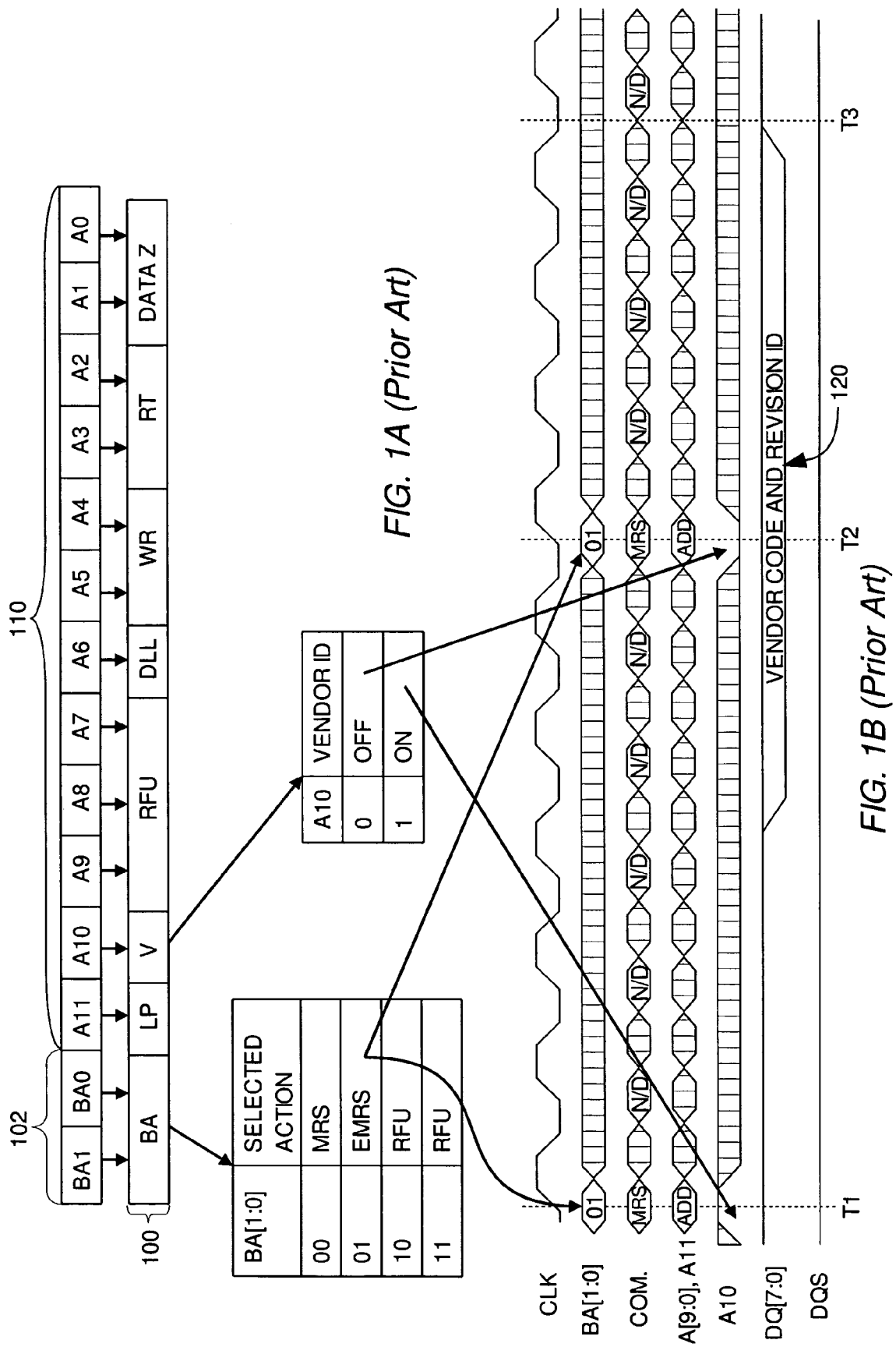
FIG. 1A is a diagram depicting the control bits of an extended mode register of the prior art.
FIG. 1B is a timing diagram depicting a prior art method for reading a special mode register.

At some time later (T2) after the MRS-R command has been issued, the SMR data may be placed on the data bus outputs DQ[15:0] and DQS may be raised to indicate that the valid SMR data is ready to be read from the data bus. The MRS-R command may then automatically terminate by some later time, T3, and other commands of any type may then be issued to the memory device 200 as needed. Accordingly, the MRS-R command may be used to read SMR 256 much more quickly than the two MRS commands of the prior art described with respect to FIGS. 1A and 1B. As an example, the two MRS commands of the prior art may take 10 clock cycles to perform whereas the MRS-R command may only take 3 clock cycles to perform.

Figure 5:
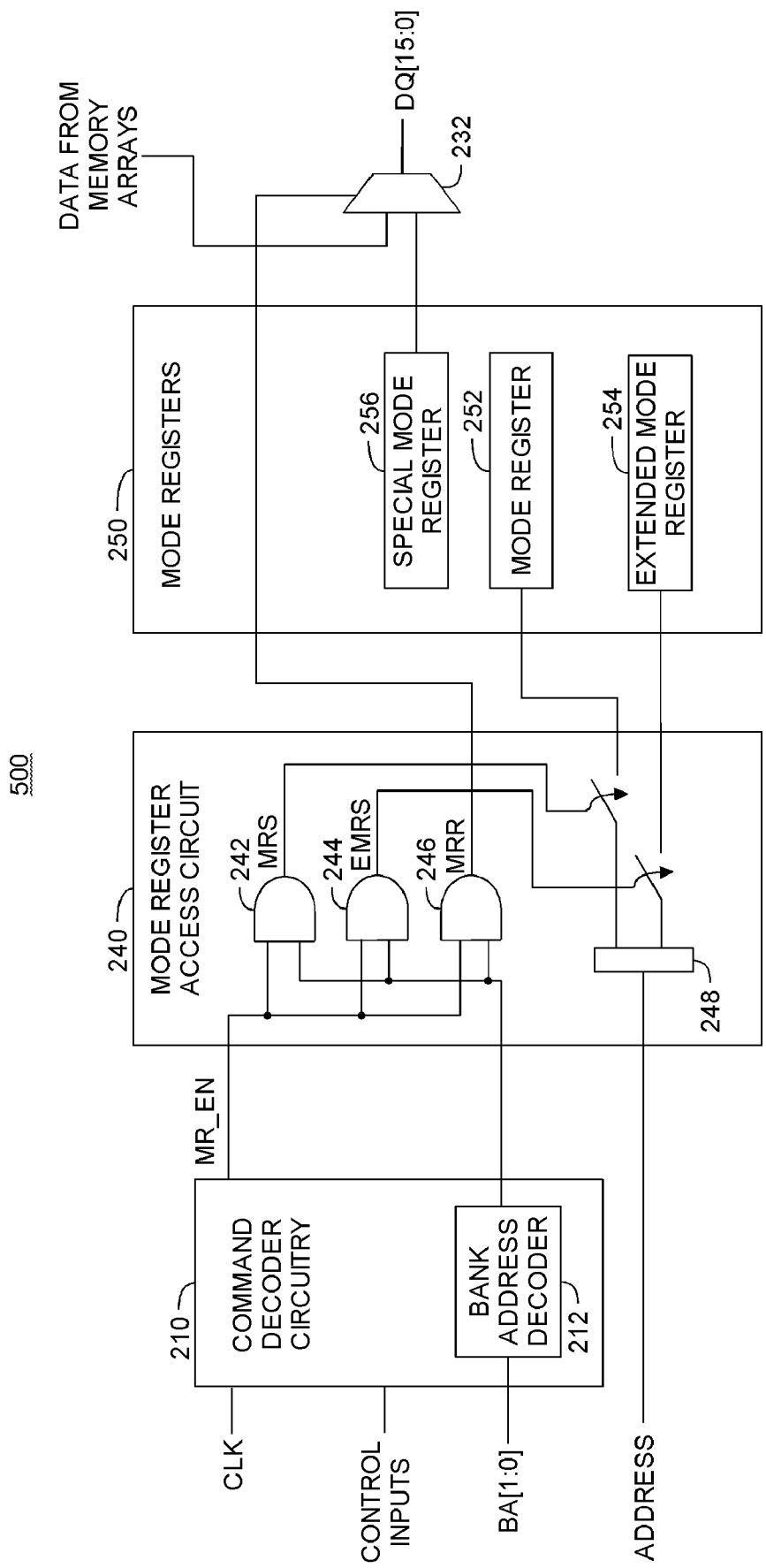
FIG. 5 is a block diagram depicting circuitry for reading a special mode register according to one embodiment of the invention.

FIG. 5 is a block diagram depicting circuitry 500 for reading a special mode register according to one embodiment of the invention. The circuitry 500, contained within the memory device 200, includes the command decoder circuitry 210, the mode register access circuit 240, and the mode registers 250. The command decoder circuitry 210 takes as inputs the CLK signal and the control inputs. When an MRS, EMRS, or MRS-R command is received, the command decoder circuitry decodes the command and outputs a signal to the mode register access circuit 240 which enables access to the mode registers (the MR_EN signal). At the same time, the bank address bits BA[1:0] are decoded by a bank address decoder 212 in the command decoder circuitry 210.

The decoded bank address bits and the MR_EN signal are used in the mode register access circuit 240 to access the mode registers 250. The MR_EN signal and decoded bank address bits are received by a group of AND gates 242, 244, 246 which issue control signals according to the command being received. In the illustrated arrangement, if the decoded bank address bits are '00' and MR_EN is '1', the received command is an MRS command, and an MRS signal is asserted by the upper AND gate 242. As illustrated, the MRS signal may be used by a switch 248 to connect MR 252 to the address inputs. Thus, the address bits may be read into MR when performing the MRS command.

If the decoded bank address bits are '01' and MR_EN is '1', the received command is an EMRS command and an EMRS signal is asserted by the middle AND gate 244. The EMRS signal is used by switch 248 to connect EMR 254 to the address inputs. Thus, the address bits may be read into EMR, successfully performing the EMRS command.

If, instead, the decoded bank address bits are '11' and MR_EN is '1', the received command is an MRS-R command, and a memory register read signal (MRR signal) is asserted by the lower AND gate 246. As illustrated, the MRR signal may be used by multiplexer 232 to connect SMR 256 to the data bus outputs DQ[15:0]. For some embodiments, other circuitry (not shown) may assert the DQS signal to indicate that the data on DQ[15:0] is valid. SMR 256 may then be read from the data bus. After SMR 256 is read from the data bus, the other circuitry may self-terminate the MRS-R command, placing DQ[15:0] and DQS in a high-impedance state, thus completing the MRS-R command.

Accessing Multiple Special Mode Registers

Figure 6:
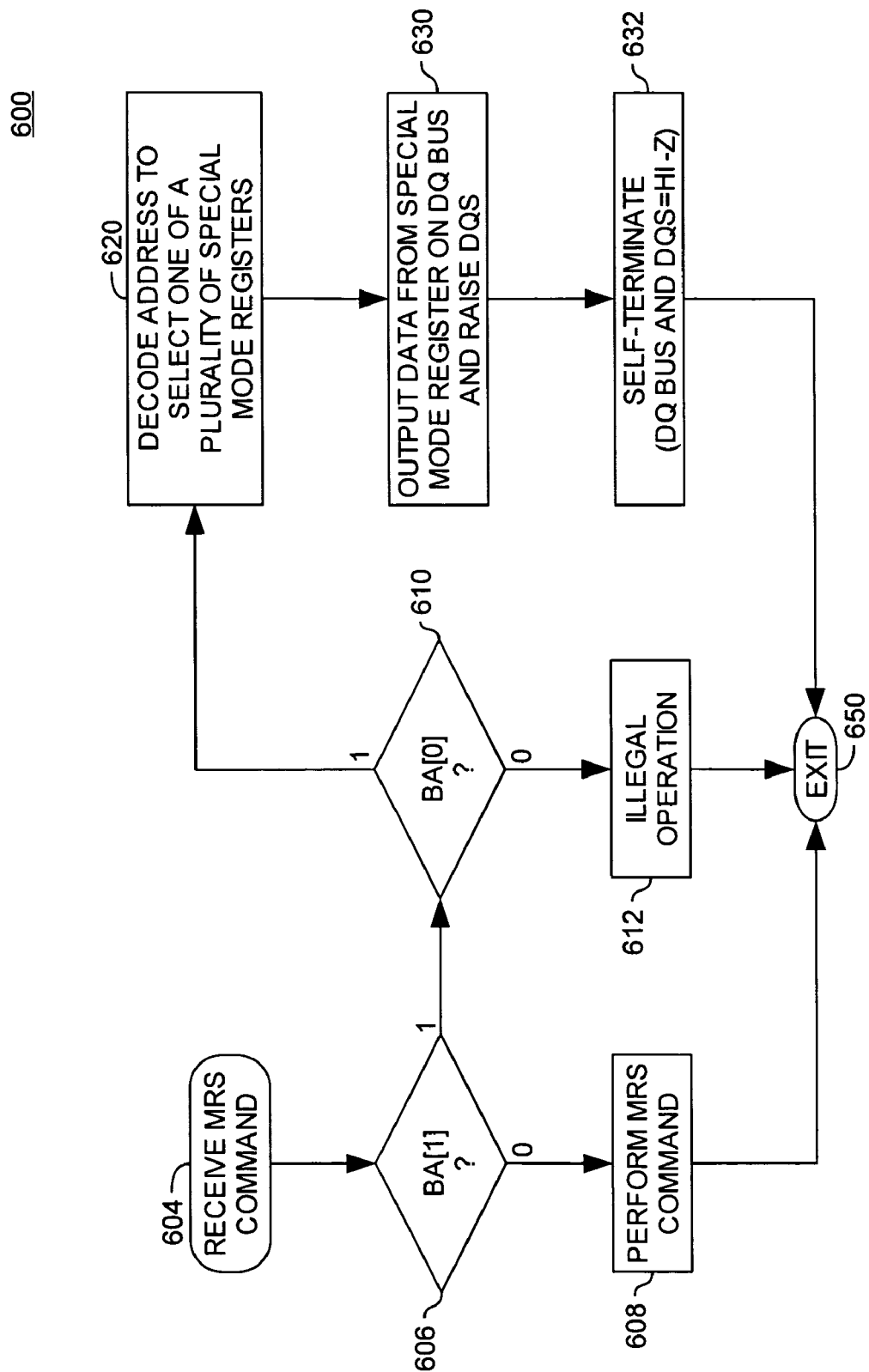
FIG. 6 is a flow chart depicting a process for accessing one of a plurality of special mode registers according to one embodiment of the invention.

According to another embodiment of the invention, the special mode register being read may be selected from one of a plurality of SMRs 256, for example, using the lower address bits (e.g., A[1:0]). For instance, the SMRs 256 may include special mode registers SMR0, SMR1, SMR2, SMR3, etc., each of which contain different information (vendor ID, temperature, etc.) about the memory device 200. FIG. 6 is a flow chart depicting a process 600 for accessing one of a plurality of special mode registers according to one embodiment of the invention. The process 600 may begin at step 604 where an MRS command is received.

After the MRS command is received, BA[1] is examined at step 606. If BA[1] is '0', the MRS command is performed at step 608 and the process 600 may terminate at step 650. If, however, BA[1] is one, the process 600 may continue to step 610 where BA[0] is examined. Because the bank address combination of BA[1:0]='10' may still be reserved for future use, if BA[0] is determined to be '0' at step 610, the reserved bank address combination may cause an illegal operation to be performed at step 612 and the process 600 may terminate at step 650.

If, however, BA[0] is determined to be '1' at step 610, the MRS-R command may be issued to read one of the plurality of SMRs 256. Thus, at step 620, the address bits may be decoded to select one of the plurality of SMRs 256 to be read by the MRS-R command. At step 630, the process 600 outputs data from the selected SMR 256 and raises DQS to signal that valid data is being output on the data bus DQ[15:0]. After SMR 256 is output, the MRS-R command may then self-terminate at step 632 by placing the data bus DQ[15:0] and DQS in a high impedance (Hi-Z) state. After the MRS-R command self-terminates at step 632, the process 600 may terminate at step 650.

Figure 7:
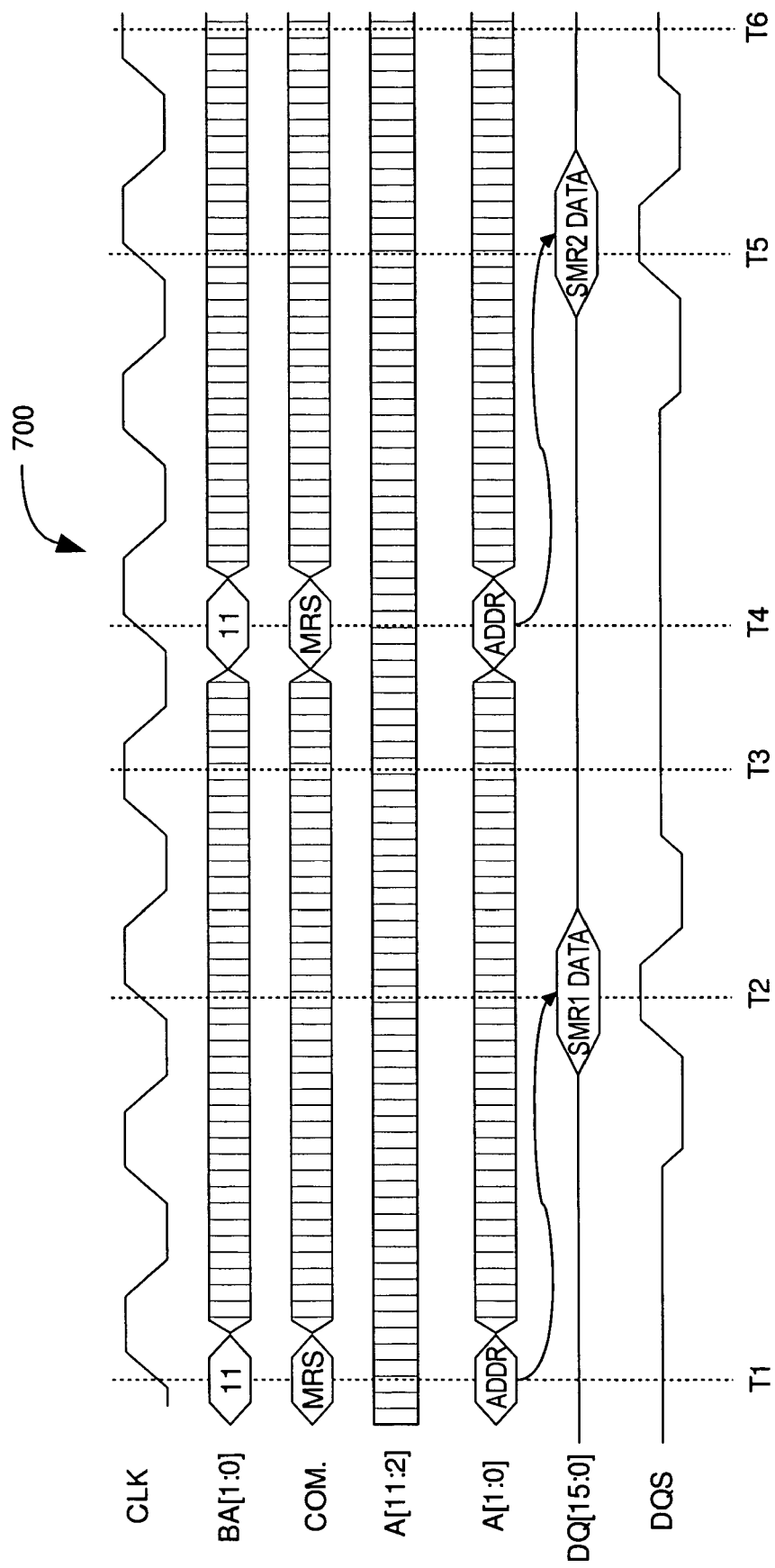
FIG. 7 is a timing diagram depicting a timing sequence for accessing one of a plurality of special mode registers according to one embodiment of the invention.

FIG. 7 is a timing diagram depicting a timing sequence 700 for accessing one of a plurality of special mode registers according to one embodiment of the invention. At time T1, the MRS-R command may be initiated by placing the MRS command on the command inputs and by placing BA[1:0]='11' on the bank address inputs. The address bits A[1:0] used to select the SMR 256 to be read may also be placed on the address inputs for the memory device 200. For instance, A[1:0]='01' may be used to read the special mode register SMR1. In one embodiment of the invention, the MRS-R command may not write to MR or EMR or otherwise use the remaining address inputs A[11:2], and accordingly the address inputs A[11:2] may be placed in a high impedance state. At some time later (T2), the data from the special mode register SMR1 selected by the address bits A[1:0]='01' may be placed on the data bus outputs DQ[15:0] and DQS may be raised to indicate that the selected SMR data is valid and ready to be read from the data bus. The MRS-R command may then automatically terminate by some later time, T3.

Because the MRS-R command has automatically terminated, other commands, such as another MRS-R command may be issued at some later time, T4. Thus, at time T4, another MRS-R command may be initiated by placing the MRS command on the command inputs and by placing BA[1:0]='10' on the bank address inputs. At time T4, another combination of address bits may be used to read another special mode register. Illustratively, address bits A[1:0]='10' may be used to read the special mode register SMR2. Again, the MRS-R command may not write to MR or EMR or otherwise use the remaining address inputs A[11:2], and accordingly the address inputs A[11:2] may be placed in a high impedance state. At some time later (T5), the data from the special mode register SMR2 selected by the address bits A[1:0]='10' may be placed on the data bus outputs DQ[15:0] and DQS may be raised to indicate that the selected SMR data is valid and ready to be read from the data bus. The MRS-R command may then automatically terminate by some later time, T6 and other commands of any type may then be issued to the memory device 200 as needed.

Modified circuitry similar to the circuitry 500 (described with respect to FIG. 5) may be used for accessing one of a plurality of SMRs 256 using the address bits A[1:0] (as described with respect to FIGS. 6 and 7) according to one embodiment of the invention. The circuitry 500 may be modified to read one of a plurality of SMRs 256 by inserting an address decoder into the circuitry 500. The decoded address bits may then be used by an additional multiplexer to select the appropriate SMR 256 to be read by the MRS-R command. The selected SMR 256 may then be output on the data bus lines DQ[15:0] using the multiplexer 232 described with respect to FIG. 5. Other possible circuitry configurations for reading one of a plurality of SMRs 256 should also be readily apparent to those skilled in the art.

While the foregoing is directed to embodiments of the present invention, other and further embodiments of the invention may be devised without departing from the basic scope thereof, and the scope thereof is determined by the claims that follow.

What is claimed is:

1. A method for accessing a special mode register of a memory device comprising a single mode register, an extended mode register, and a plurality of special mode registers comprising the special mode register, the special mode register comprising information about at least one of the memory device and operational characteristics of the memory device, the method comprising:

detecting a command and a bank address combination to access the special mode register, wherein the bank address combination is different from a bank address combination used to access the single mode register or the extended mode register, wherein one or more address bits specify one of the plurality of special mode registers to be accessed by the command;

executing the command by driving data from the special mode register onto a data bus; and self-terminating the command by automatically placing the data bus in a high impedance state some time after driving the data.

2. The method of claim 1, further comprising:

asserting a signal, wherein the signal indicates that the data from the special mode register being driven onto the data bus is valid data; and self-terminating the command by automatically placing the signal in a high impedance state some time after driving the data.

3. The method of claim 1, wherein the bank address combination comprises two or more bank address bits, wherein a first combination of bank address bits specifies the command to drive the data from the special mode register onto the data bus and wherein a second combination of bank address bits specifies a command to set one or more bits in a mode register.

4. The method of claim 1 wherein the command to access the special mode register is incapable of changing one or more bits in a mode register.

5. An integrated circuit, comprising:
a single mode register;
an extended mode register;
a plurality of special mode registers, the special mode registers comprising information about at least one of the memory device and operational characteristics of the memory device;
a command decoder configured to detect a command and a bank address combination, wherein the bank address combination is different from a bank address combination used to access the single mode register or the extended mode register, wherein one or more address bits specify one of the plurality special mode registers to be accessed by the command; and
access circuitry configured to receive one or more signals from the command decoder indicating receipt of the command to access the special mode register and, in response, drive data from the special mode register onto a data bus, and automatically self-terminate the command by placing the data bus in a high impedance state.

6. The integrated circuit of claim 5, wherein the access circuitry is further configured to assert a signal, wherein the signal indicates that the data from the special mode register being driven onto the data bus is valid data.

7. The integrated circuit of claim 5, wherein the command comprises two or more bank address bits, wherein a first combination of bank address bits specifies the command to drive the data from the special mode register onto the data bus and wherein a second combination of bank address bits specifies a command to set one or more bits in a mode register.

8. The integrated circuit of claim 5 wherein the command to access the special mode register is incapable of changing one or more bits in a mode register.

9. A method for accessing a special mode register of a memory device comprising a single mode register, an extended mode register, and a plurality of special mode registers, the special mode registers comprising information about one of the memory device and operational characteristics of the memory device, the method comprising:
detecting a command and a bank address to access one of the plurality of special mode registers, wherein the bank address combination is different from a bank address combination used to access the single mode register or the extended mode register, wherein one or more address bits specify the one of the plurality of special mode registers to be accessed by the command;
selecting one of the special mode registers based on an address presented in conjunction with the command;
driving data from the selected special mode register onto a data bus; and
self-terminating the command by automatically placing the data bus in a high impedance state.

10. The method of claim 9, further comprising, asserting a signal, wherein the signal indicates that the data from the special mode register being driven onto the data bus is valid data.

11. The method of claim 9, wherein the command comprises two or more bank address bits, wherein a first combination of bank address bits specifies the command to drive the data from the special mode register onto the data bus and wherein a second combination of bank address bits specifies a command to set one or more bits in a mode register.

12. The method of claim 9 wherein the command to access the special mode register is incapable of changing one or more bits in a mode register.

13. An integrated circuit, comprising:
an extended mode register;
two or more special mode registers, each of the special mode registers comprising information about one of the memory device and operational characteristics of the memory device;
a command decoder configured to detect a command and a bank address combination, wherein the bank address combination is not used to access the single mode register or the extended mode register, wherein one or more address bits specify one of the plurality of special mode registers to be accessed by the command; and
access circuitry configured to receive one or more signals from the command decoder indicating receipt of the command to access one of the two or more special mode registers and, in response, drive data from the specified special mode register onto a data bus, and self-terminate the command by automatically placing the data bus in a high impedance state, wherein the selected special mode register is specified by an address presented in conjunction with the command.

14. The integrated circuit of claim 13, wherein the access circuitry is further configured to assert a signal, wherein the signal indicates that the data from the specified special mode register being driven onto the data bus is valid data.

15. The integrated circuit of claim 13, wherein the command comprises two or more bank address bits, wherein a first combination of bank address bits specifies the command to drive the data from the specified special mode register onto the data bus and wherein a second combination of bank address bits specifies a command to set one or more bits in a mode register.

16. The integrated circuit of claim 13 wherein the command to access the specified special mode register is incapable of changing one or more bits in a mode register.

17. A memory device, comprising:
a single mode register;
an extended mode register;
a plurality of special mode registers, each special mode register comprising information about one of the memory device and operational characteristics of the memory device;
a command decoder configured to detect a command and a bank address combination, wherein the bank address combination is different from a bank address combination used to access the single mode register or the extended mode register, wherein one or more address bits specify one of the plurality of special mode registers to be accessed by the command; and
access circuitry configured to receive one or more signals from the command decoder indicating receipt of the command to access the special mode register and, in response, drive data from the special mode register onto a data bus, and automatically place the data bus in a high impedance state.

18. A memory device, comprising:

a plurality of special mode registers, each special mode register comprising information about one of the memory device and operational characteristics of the memory device;

a mode register; an extended mode register; a command decoder configured to detect a command and a bank address combination, wherein the bank address combination is different from a bank address combination used to access the single mode register or the extended mode register, wherein one or more address bits specify one of the plurality of special mode registers to be accessed by the command; and access circuitry configured to receive one or more signals from the command decoder indicating receipt of the command to access the special mode register and, in response, drive data from the special mode register onto a data bus, and self-terminate the command by automatically placing the data bus in a high impedance state, wherein the command comprises two or more bank address bits, wherein a first combination of bank address bits specifies the command to drive the data from the special mode register onto the data bus, wherein a second combination of bank address bits specifies a command to set one or more bits in the mode register, and wherein a third combination of bank address bits specifies a command to set one or more bits in the extended mode register.

19. A memory device, comprising:

a plurality of special mode registers, the special mode register comprising information about one of the memory device and operational characteristics of the memory device;

a single mode register; an extended mode register;

a decoder for the plurality of special mode registers for decoding commands received by the memory device; an an access controller for accessing the special mode register, wherein the access controller is configured to receive one or more signals from the means for decoding indicating receipt of a command and a bank address combination is different from a bank address combination used to access the single mode register or the extended mode register, wherein one or more address bits specify one of the plurality of special mode registers to be accessed by the command and, in response, drive data from the special mode register onto a data bus, and self-terminate the command by automatically placing the data bus in a high impedance state.

* * * * *